US008322894B1

(12) United States Patent
Lee

(10) Patent No.: US 8,322,894 B1
(45) Date of Patent: Dec. 4, 2012

(54) LAMP ASSEMBLY

(76) Inventor: Hsing-Mien Lee, Tainan (TW)

( * ) Notice: Subject to any disclaimer, the term of this patent is extended or adjusted under 35 U.S.C. 154(b) by 38 days.

(21) Appl. No.: 13/159,797

(22) Filed: Jun. 14, 2011

(51) Int. Cl.
*H01G 5/00* (2006.01)

(52) U.S. Cl. ......................... 362/297; 362/346; 362/347

(58) Field of Classification Search ............. 362/296.01, 362/296.07, 297, 302, 341, 346–348, 350, 362/355, 361, 395, 410, 414, 516, 507, 518; 359/459, 546
See application file for complete search history.

(56) References Cited

U.S. PATENT DOCUMENTS 4,704,661 A * 11/1987 Kosmatka ..................... 362/518
6,000,816 A * 12/1999 Serizawa et al. .............. 362/297
6,481,872 B1 * 11/2002 Hayashi et al. ............... 362/297
6,773,150 B2 * 8/2004 Giordani et al. .............. 362/518
7,108,412 B2 * 9/2006 Ishida et al. .................. 362/518
8,197,101 B2 * 6/2012 Kokado et al. ........... 362/296.07
2006/0013011 A1 * 1/2006 Rice ............................. 362/518

* cited by examiner

*Primary Examiner* — Hargobind S Sawhney
(74) *Attorney, Agent, or Firm* — Nixon & Vanderhye P.C.

(57) ABSTRACT

A lamp assembly includes a shell wall defining a receiving space that retains a light source therein, and a reflecting unit. The shell wall has a central wall unit and a pair of connecting wall segments. The central wall unit has a base wall segment and a pair of connecting wall segments extending respectively from longitudinal ends of the base wall segment. The extending wall segments extend respectively from side ends of the base wall segment, interconnect the connecting wall segments and cooperate with the connecting wall segments to define an opening in spatial communication with the receiving space. A distance between the distal ends of the connecting wall segments is larger than that between the distal ends of the extending wall segments. The reflecting unit includes convex first reflecting members protruding inwardly from the extending wall segments, and prismatic second reflecting members protruding inwardly from the central wall unit.

5 Claims, 6 Drawing Sheets

LAMP ASSEMBLY

BACKGROUND OF THE INVENTION

1. Field of the Invention

The invention relates to a lamp assembly that has a relatively high light-emitting efficiency.

2. Description of the Related Art

As shown in FIGS. 1 and 2, Taiwanese Patent No. M356854 disclose a conventional lamp assembly 1 that includes a light source 11 and a reflecting shell 12 retaining the light source 11 therein. The reflecting shell 12 has a convex portion 125 that projects inwardly toward the light source 11, and a plurality of convex mirrors 121 that protrude inwardly from an inner surface thereof, so that light generated by the light source 11 can be reflected by the convex mirrors 121 to project out of the reflecting shell 12. The presence of the convex mirrors 121 also enlarges the illumination range of the conventional lamp assembly 1. The reflecting shell 12 is configured to be substantially elliptical, so that the convex mirrors 121 may have different distances from and different angles relative to the light source 11. However, since the convex mirrors 121 are identical, a part of the light reflected by one of the convex mirrors 121 may have a brightness different from that of another part of the light reflected by another one of the convex mirrors 121, thereby resulting in an uneven light output from the conventional lamp assembly 1.

SUMMARY OF THE INVENTION

Therefore, the object of the present invention is to provide a lamp assembly that has a relatively high efficiency and an even brightness of light output.

Accordingly, a lamp assembly of the present invention comprises a light source, a shell wall, and a reflecting unit. The shell wall defines a receiving space that retains the light source therein, and has a central wall unit and a pair of extending wall segments. The central wall unit has a base wall segment and a pair of connecting wall segments. The base wall segment is mounted with the light source, and has side ends opposite to each other in a left-right direction, and longitudinal ends opposite to each other in a front-rear direction transverse to the left-right direction. The connecting wall segments extend respectively from the longitudinal ends of the base wall segment. Each of the connecting wall segments has a distal end. The distal ends of the connecting wall segments are opposite to each other in the front-rear direction. The extending wall segments extend respectively from the side ends of the base wall segment, interconnect the connecting wall segments and cooperate with the connecting wall segments to define an opening in spatial communication with the receiving space. Each of the extending wall segments has a distal end. The distal ends of the extending wall segments are opposite to each other in the left-right direction. A distance between the distal ends of the connecting wall segments is larger than that between the distal ends of the extending wall segments. The reflecting unit includes a plurality of first reflecting members configured to be convex and protruding inwardly from the extending wall segments, and a plurality of second reflecting members configured as prisms and protruding inwardly from the central wall unit. Light generated from the light source toward the shell wall is reflected by the first and second reflecting members and emitted out of the shell wall through the opening.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
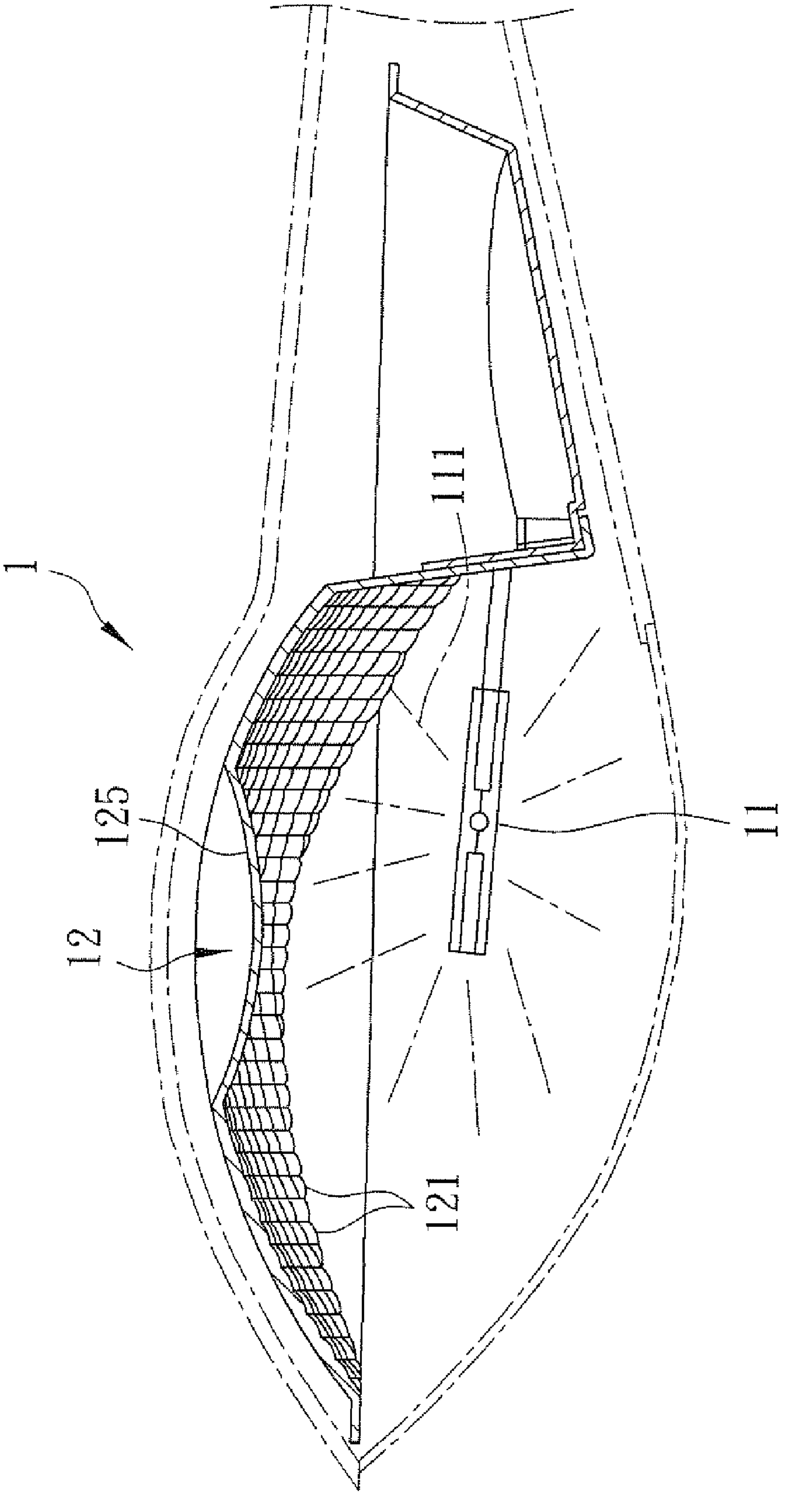
FIG. 1 PRIOR ART
FIG. 1 is a schematic sectional view of a conventional lamp assembly disclosed in Taiwanese Patent No. M356854.
Figure 2:
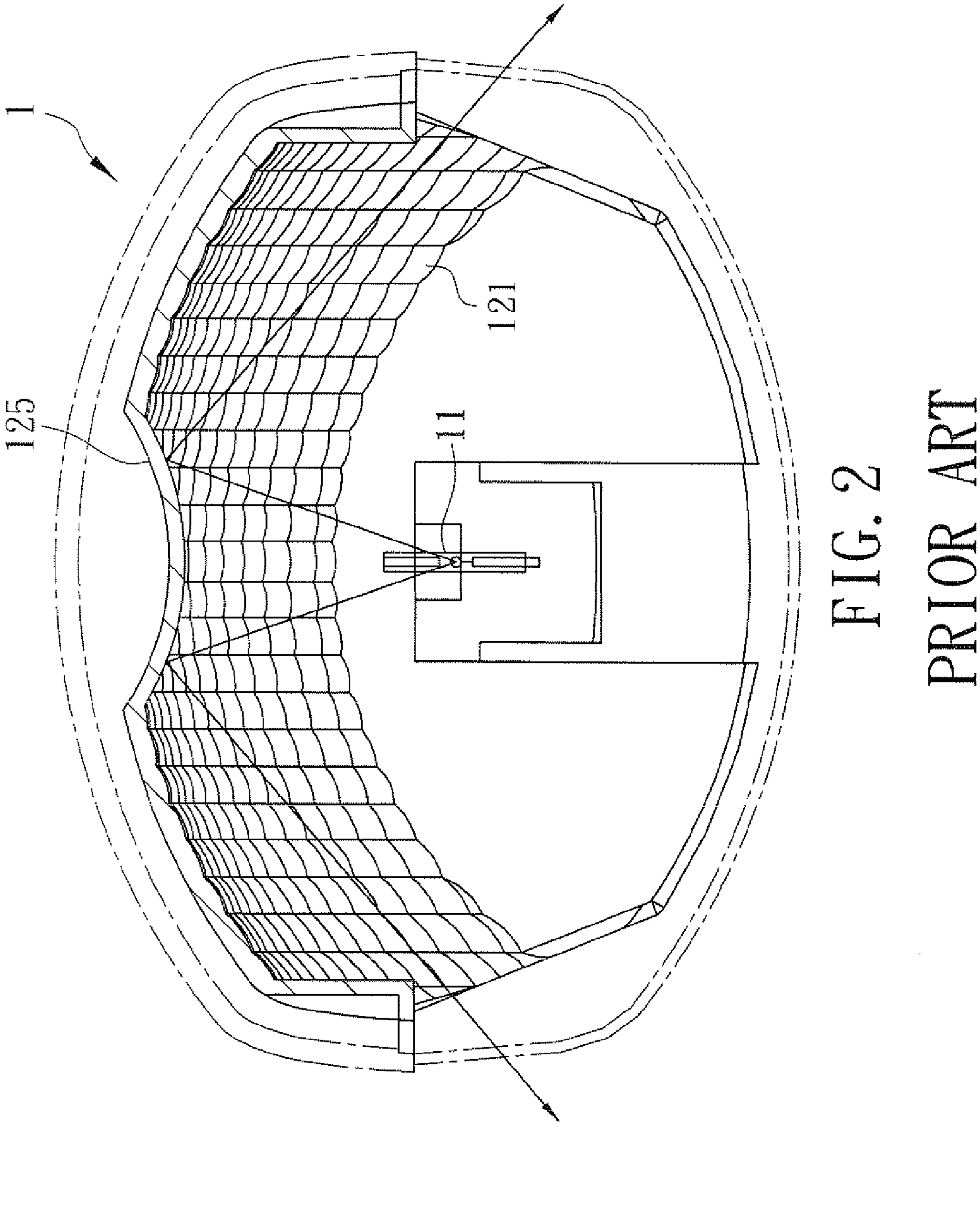
FIG. 2 PRIOR ART
FIG. 2 is another sectional view of the conventional lamp assembly disclosed in Taiwanese Patent No. M356854.

Before the present invention is described in greater detail, it should be noted that like elements are denoted by the same reference numerals throughout the disclosure.

Figure 3:
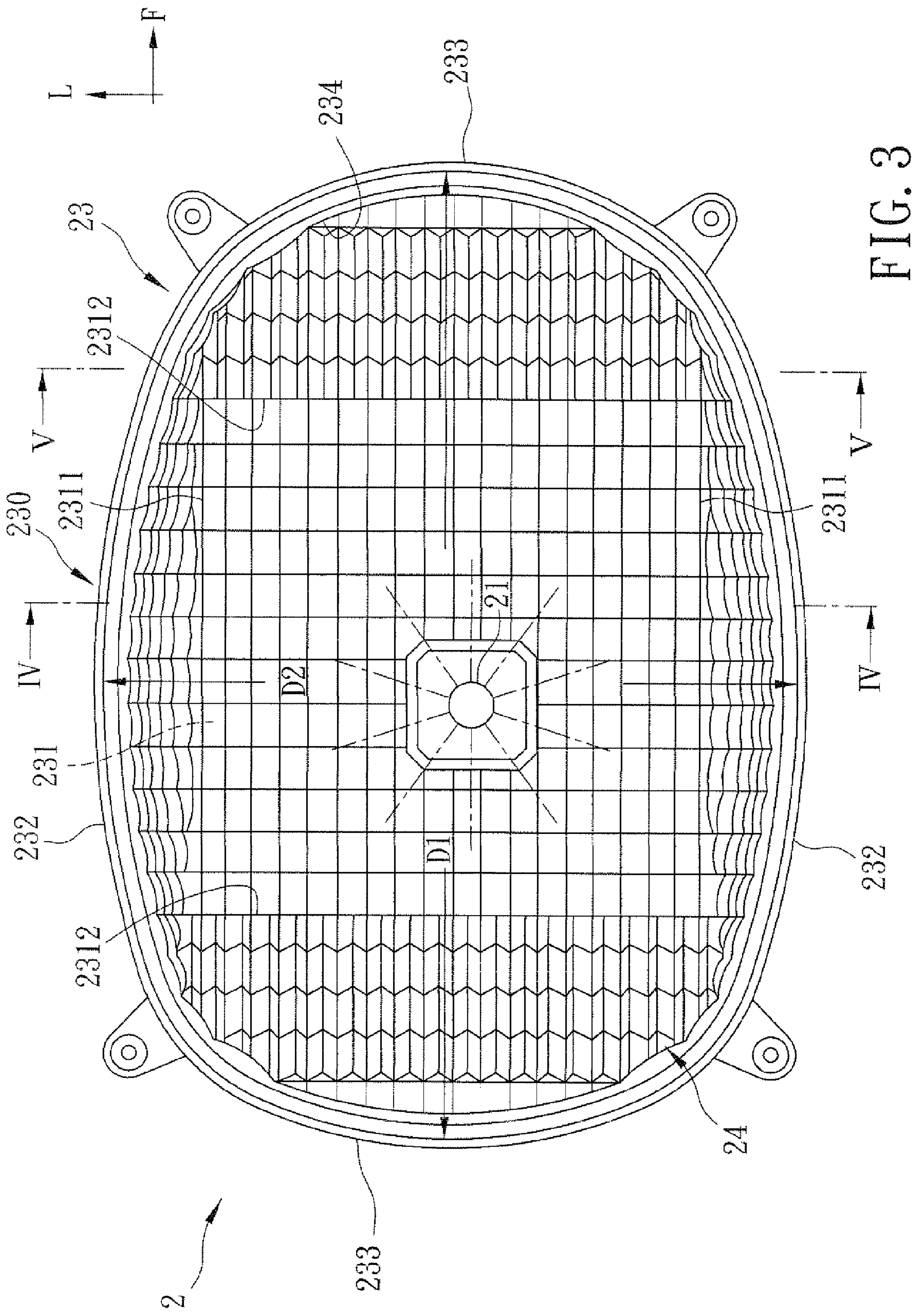
FIG. 3 is a bottom view of a first preferred embodiment of a lamp assembly according to the invention.
Figure 4:
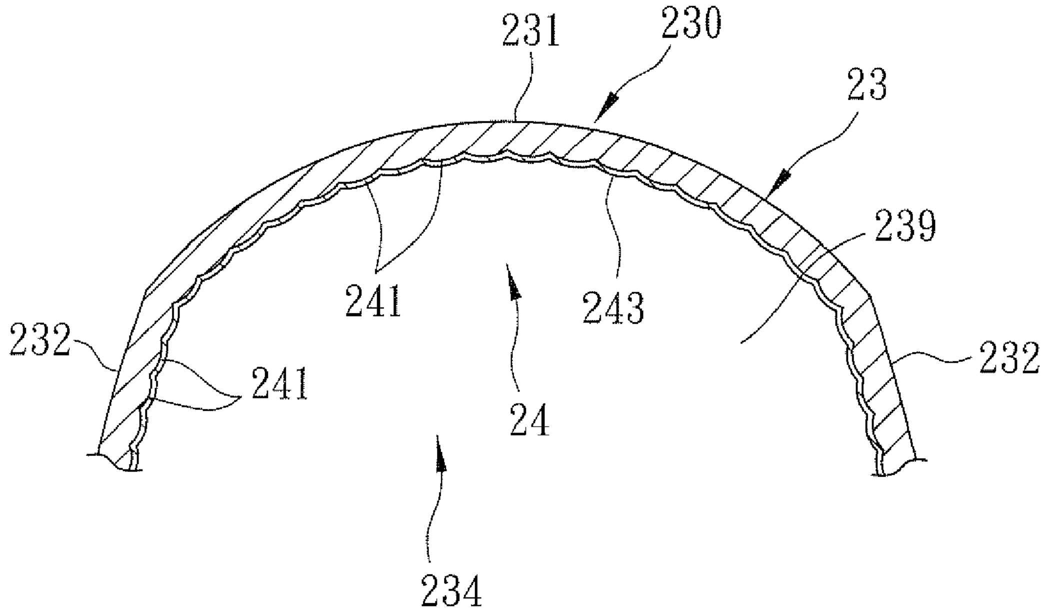
FIG. 4 is a fragmentary sectional view of the first preferred embodiment taken along line IV-IV in FIG. 3.

As shown in FIGS. 3 and 4, the first preferred embodiment of a lamp assembly 2 according to the present invention comprises a light source 21 and a shell wall 23 defining a receiving space 239 that retains the light source 21 therein.

The shell wall 23 has a central wall unit 230 that has a base wall segment 231 and a pair of connecting wall segments 233. The base wall segment 231 is mounted with the light source 21, and has side ends 2311 opposite to each other in a left-right direction (L), and longitudinal ends 2312 opposite to each other in a front-rear direction (F) transverse to the left-right direction (L). The connecting wall segments 233 extend respectively from the longitudinal ends 2312 of the base wall segment 231. Each of the connecting wall segments 233 has a distal end. The distal ends of the connecting wall segments 233 are opposite to each other in the front-rear direction (F). The shell wall 23 further has a pair of extending wall segments 232 that extend respectively from the side ends 2311 of the base wall segment 231, that interconnect the connecting wall segments 233, and that cooperate with the connecting wall segments 233 to define an opening 234 in spatial communication with the receiving space 239. Each of the extending wall segments 232 has a distal end. The distal ends of the extending wall segments 232 are opposite to each other in the left-right direction (L). A distance (D1) between the distal ends of the connecting wall segments 233 is larger than a distance (D2) between the distal ends of the extending wall segments 232.

Figure 5:
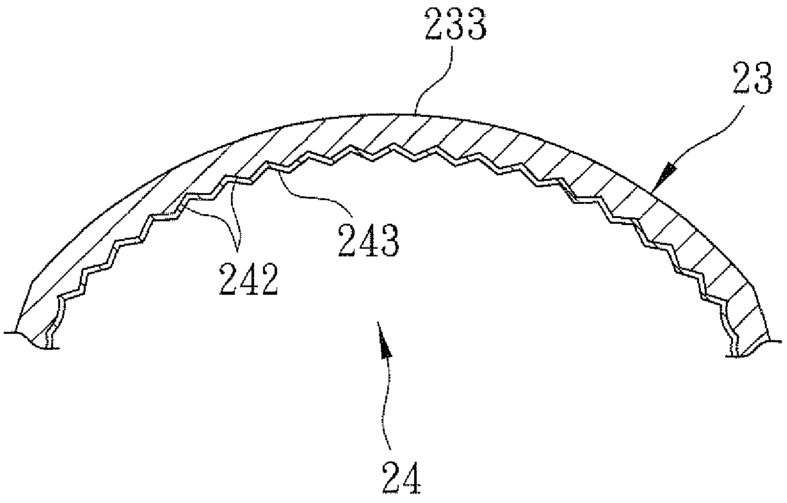
FIG. 5 is another fragmentary sectional view of the first preferred embodiment taken along line V-V in FIG. 3.

As further shown in FIG. 5, the lamp assembly 2 of this invention further comprises a reflecting unit 24 including a plurality of first reflecting members 241 and a plurality of second reflecting members 242. The first reflecting members 241 are configured to be convex and protrude integrally and inwardly from an inner surface of the base wall segment 231 and the extending wall segment 232. In this embodiment, the second reflecting members 242 are configured as prisms and protrude integrally and inwardly from an inner surface of the connecting wall segments 233. The reflecting unit 24 further includes a specular reflecting layer 243 formed on the first and second reflecting members 241, 242 by vacuum plating. As such, light generated from the light source 21 toward the shell wall 23 is reflected by the first and second reflecting members 241, 242 and emitted out of the shell wall 23 through the opening 234. The presence of the specular reflecting layer 243 can increase the light output efficiency of the lamp assembly 2 of this invention.

Although the connecting wall segments 233 are located farther from the light source 21 compared to the extending wall segments 232, the prismatic configuration of the second reflecting members 242 would increase the reflection of the light projected from the light source 21 toward the connecting wall segments 233, thereby resulting in even light output of the lamp assembly 2 of this invention.

Figure 6:
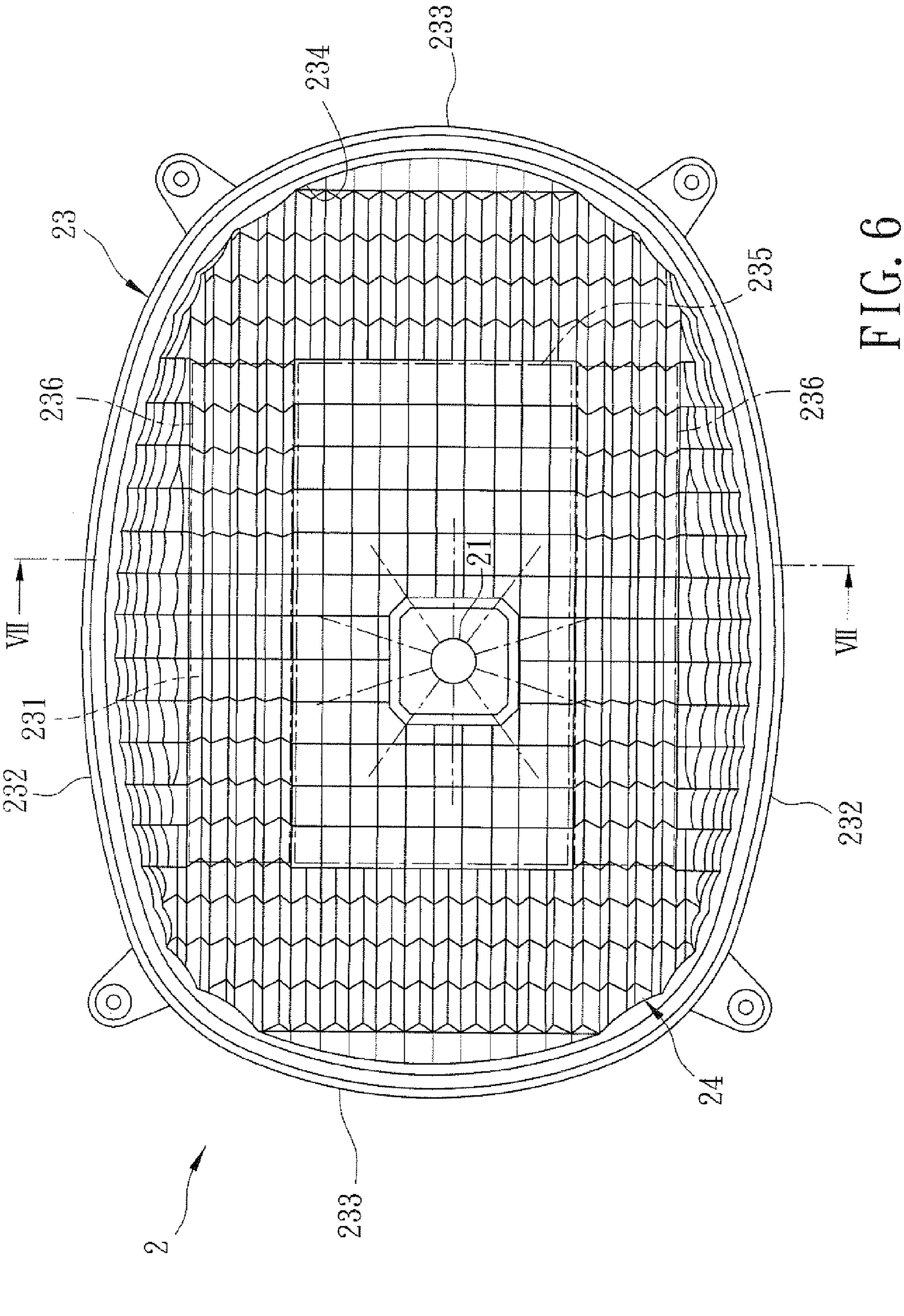
FIG. 6 is a bottom view of a second preferred embodiment of a lamp assembly according to the invention.
Figure 7:
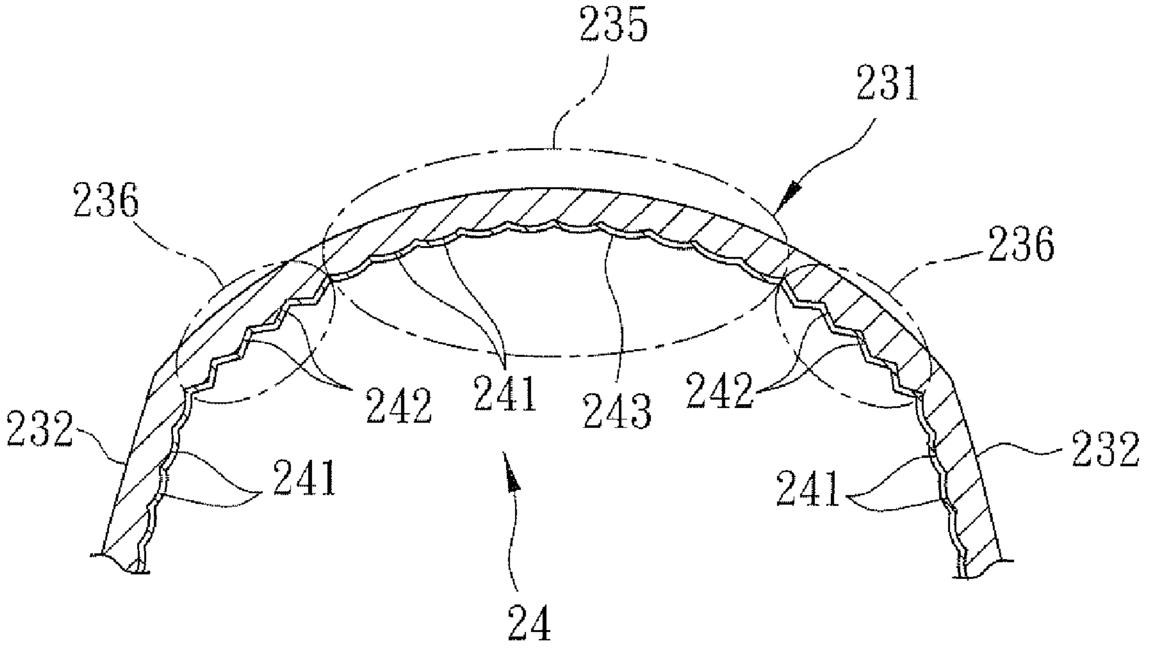
FIG. 7 is a fragmentary sectional view of the second preferred embodiment taken along line VII-VII in FIG. 6.

Referring to FIGS. 6 and 7, the second preferred embodiment of the lamp assembly 2 according to the present invention has a structure similar to that of the first embodiment. The main difference between this embodiment and the previous embodiment resides in the following. In this embodiment, the base wall segment 231 has a middle wall portion 235 and a pair of side wall portions 236 flanking the middle wall portion 235 and connected respectively to the extending wall segments 232. The first reflecting members 241 protrude inwardly from the extending wall segment 232 and the middle wall portion 235 of the base wall segment 231. The second reflecting members 242 protrude inwardly from the connecting wall segments 233 and the side wall portions 236 of the base wall segment 231. The second preferred embodiment has the same advantages as those of the first preferred embodiment.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A lamp assembly comprising:

a light source;

a shell wall defining a receiving space that retains said light source therein, and having a central wall unit that has a base wall segment that is mounted with said light source, and that has side ends opposite to each other in a left-right direction, and longitudinal ends opposite to each other in a front-rear direction transverse to the left-right direction, and a pair of connecting wall segments that extend respectively from said longitudinal ends of said base wall segment, each of said connecting wall segments having a distal end, said distal ends of said connecting wall segments being opposite to each other in the front-rear direction, and a pair of extending wall segments that extend respectively from said side ends of said base wall segment, that interconnect said connecting wall segments, and that cooperate with said connecting wall segments to define an opening in spatial communication with said receiving space, each of said extending wall segments having a distal end, said distal ends of said extending wall segments being opposite to each other in the left-right direction, a distance between said distal ends of said connecting wall segments being larger than that between said distal ends of said extending wall segments; and a reflecting unit including a plurality of first reflecting members configured to be convex and protruding inwardly from said extending wall segments, and a plurality of second reflecting members configured as prisms and protruding inwardly from said central wall unit;

wherein light generated from said light source toward said shell wall is reflected by said first and second reflecting members and emitted out of said shell wall through said opening.

2. The lamp assembly as claimed in claim 1, wherein said second reflecting members protrude inwardly from said connecting wall segments of said central wall unit.

3. The lamp assembly as claimed in claim 2, wherein said reflecting unit further includes a specular reflecting layer plated on said first and second reflecting members.

4. The lamp assembly as claimed in claim 1, wherein:

said base wall segment has a middle wall portion and a pair of side wall portions flanking said middle wall portion and connected respectively to said extending wall segments; and said second reflecting members protrude inwardly from said connecting wall segments and said side wall portions of said base wall segment.

5. The lamp assembly as claimed in claim 4, wherein said reflecting unit further includes a specular reflecting later plated on said first and second reflecting members.

* * * * *